(12) United States Patent
White et al.

(10) Patent No.: US 7,861,024 B2
(45) Date of Patent: Dec. 28, 2010

(54) PROVIDING A SET ASIDE MECHANISM FOR POSTED INTERRUPT TRANSACTIONS

(75) Inventors: Bryan R. White, Chandler, AZ (US); Douglas Moran, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 101 days.

(21) Appl. No.: 12/286,324

(22) Filed: Sep. 30, 2008

(65) Prior Publication Data

US 2010/0082866 A1 Apr. 1, 2010

(51) Int. Cl.
*G06F 13/00* (2006.01)
(52) U.S. Cl. ........................ 710/263; 710/48; 710/260
(58) Field of Classification Search .................. 710/48, 710/306, 308, 310, 260, 263; 713/300, 320, 713/324; 718/100, 102, 103, 108
See application file for complete search history.

(56) References Cited

U.S. PATENT DOCUMENTS

| | | | |
|---|---|---|---|
| 6,629,179 B1 * | 9/2003 | Bashford | 710/260 |
| 7,165,131 B2 * | 1/2007 | Creta et al. | 710/100 |
| 2004/0019726 A1 * | 1/2004 | Kelley et al. | 710/305 |
| 2007/0005858 A1 * | 1/2007 | Shah et al. | 710/200 |

FOREIGN PATENT DOCUMENTS

DE 101 97 133 T 1 7/2002

OTHER PUBLICATIONS

German Patent and Trademark Office, Examination Request issued on Jul. 28, 2010 in German patent application No. 10 2009 043 411.9-53.

* cited by examiner

*Primary Examiner*—Glenn A Auve
(74) *Attorney, Agent, or Firm*—Trop, Pruner & Hu, P.C.

(57) ABSTRACT

In one embodiment, a method includes receiving an incoming posted transaction in a processor complex from a peripheral device, determining if the transaction is an interrupt transaction, and if so routing it to a first queue, and otherwise routing it to a second queue. Other embodiments are described and claimed.

20 Claims, 4 Drawing Sheets

PROVIDING A SET ASIDE MECHANISM FOR POSTED INTERRUPT TRANSACTIONS

BACKGROUND

Different communication protocols have different requirements with regard to ordering of transactions. For example, the Peripheral Component Interconnect Express (PCI Express™ (PCIe™)) protocol for links based on the PCI Express™ Specification Base Specification version 2.0 (published Jan. 17, 2007) (hereafter the PCIe™ Specification) provides for ordering requirements with regard to posted transactions such that one posted transaction cannot pass an earlier posted transaction. A posted transaction is a transaction in which a requestor does not receive a completion message when the transaction successfully completes. In contrast, for a non-posted transaction a requestor expects to receive a completion message when the transaction is correctly performed. Ordering rules for PCIe™ links require transactions following a posted transaction to push the posted transaction, generally until the posted transaction reaches a processor core. If the earlier posted transaction is an interrupt, current systems enforce such ordering rules by pushing transactions through an interconnect until the interrupt transaction is registered within a local advanced programmable interrupt controller (APIC) of the processor.

While these rules ensure that interrupts are provided to a processor, it can delay later transactions if the processor is in a low power state and therefore takes a long time to accept the interrupt and return a completion to indicate that it has been seen. That is, when a processor is placed in a low power mode, it cannot receive such interrupts and return a completion promptly. It is anticipated that in future systems with advanced processors, more opportunities will be provided for power management states in which processor cores can lose clocks and power. Furthermore, the deeper the low power state that is entered, the longer it takes to recover to an operable condition. As a result, the time for an interrupt to be registered in the processor can be relatively long. Furthermore, platform power management techniques can result in aligning interrupts to an operating system timer tick, such that a number of interrupts can be grouped together.

Thus when adhering to the ordering requirements of a given communication protocol, particularly when a processor or part thereof is placed in a low power state, a bottleneck can occur. As a result, latency sensitive devices such as peripheral devices coupled to the processor that begin a communication cycle via an interrupt, can be adversely affected. For example, a universal serial bus (USB) device may have a frame time of approximately 20 microseconds (µs). However, it may take a processor core a longer time period to wake from a low power state. Thus using current interconnect ordering rules, adverse effects can occur.

DETAILED DESCRIPTION

Figure 1:
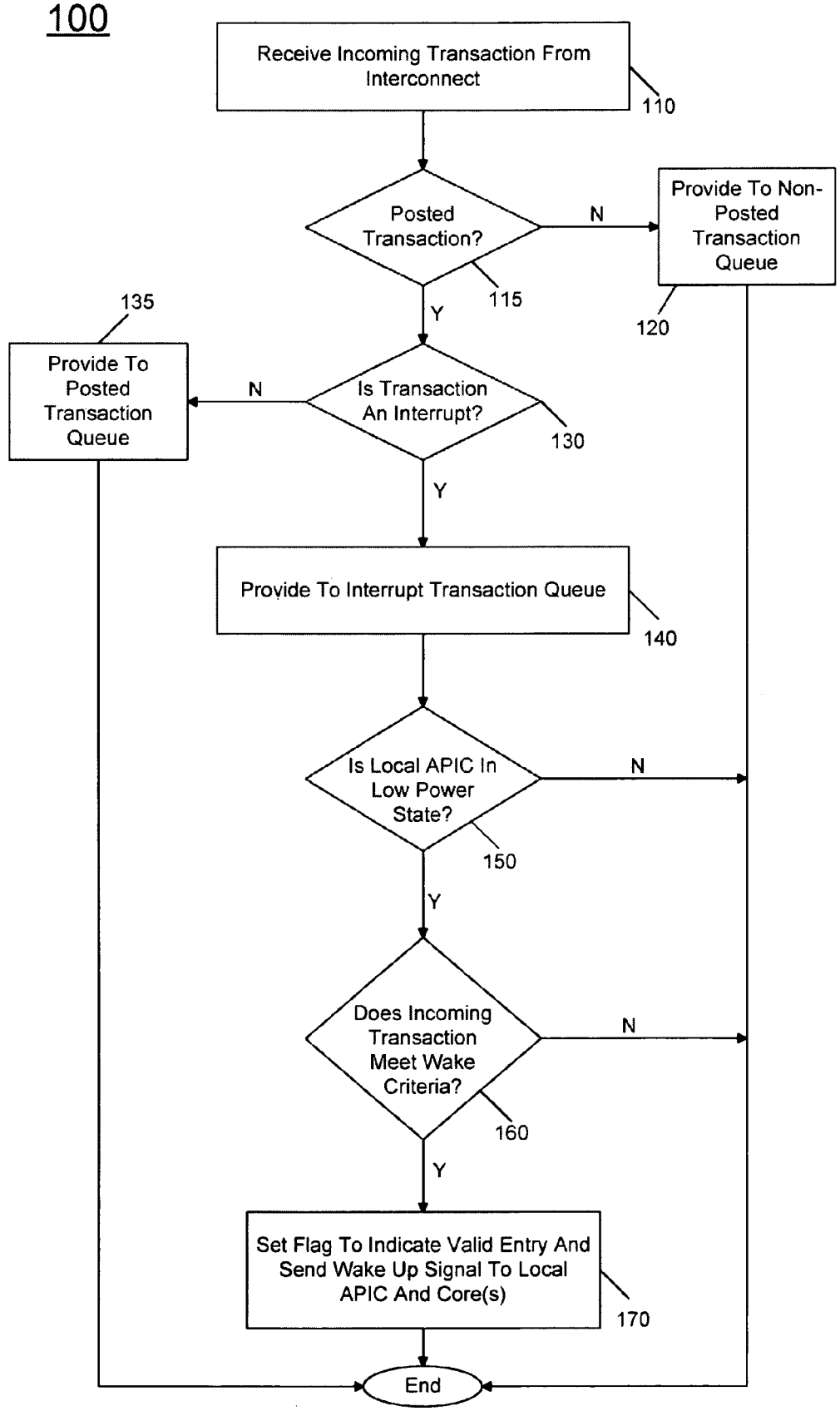
FIG. 1 is a flow diagram of a method in accordance with one embodiment of the present invention.

In various embodiments, interrupts incoming to a processor complex can be separated out from other incoming transactions to avoid the above-described effects. For example, various peripheral devices may be coupled to a processor complex through a controller such as a peripheral controller hub (PCH). In contrast to earlier generation processors, a processor complex in accordance with an embodiment may not have separate interrupt pins to receive interrupts such as a non-maskable interrupt (NMI) or system management interrupt (SMI) from an attached device. Instead, various interrupts from a peripheral device may be sent on a standard interconnect, e.g., a point-to-point interconnect between the processor complex and peripheral device (e.g., a PCH), as in-band messages. Such interrupts may be referred to as message-signaled interrupts (MSIs) or virtual legacy wire interrupts (VLWs).

Such interrupts that are transmitted along an interconnect carrying other transactions (e.g., writes and reads and so forth) can take the form of posted transactions. As such, conventionally these transactions would follow the ordering rules of a given communication protocol, e.g., a PCIe™ protocol, such as a posted transaction cannot pass another posted transaction. However, as discussed above this can result in bottlenecks and undesired operation of a peripheral device. Accordingly, in various embodiments, the separate handling of such interrupts may be realized by providing a set aside mechanism to handle these interrupt transactions and separate them from other posted transactions. Note that it can be observed that various requirements of interrupt delivery reveal that MSIs/VLWs push data posted cycles, and that read completions push MSIs/VLWs. However, once these ordering rules are satisfied, a set aside mechanism can be used for the MSIs/VLWs, allowing following traffic to continue flowing, and thus removing a bottleneck.

These interrupts can be queued in one or more storages, allowing core power savings to continue for a longer period of time. Thus low power states can be maintained for longer periods of time, facilitating power savings. In addition, such low power techniques may be high latency techniques such as when cores and so forth are powered off, enabling greater power savings. Such higher latency techniques can further occur in the face of interrupts, without causing problems with latency sensitive devices such as attached peripheral devices. In various embodiments, separate storages such as different buffers or queues may be provided for posted transactions and these interrupts transactions.

Different implementations of such separate storages can exist. For example, a processor complex can include a separate on-die storage such as a first queue for a posted transaction and a second queue for incoming MSIs or VLWs. In another implementation, rather than providing on-chip storage, an off-chip storage, such as a portion of main memory dedicated for storage of these interrupt transactions, can be provided. By setting aside these interrupt transactions, traffic behind them can continue flowing through the separate queue, removing a bottleneck. Still further, as a separate independent storage is provided for these MSIs and VLWs, core power savings can be maintained for a longer period of time. That is, high latency low power techniques can occur even when interrupts are being queued, without causing ill effects to latency sensitive devices, such as USB devices coupled to a processor complex.

Referring now to FIG. 1, shown is a flow diagram of a method in accordance with one embodiment of the present invention. More specifically, method 100 may be used to handle incoming transactions received in a processor complex from an interconnect. As one example, the interconnect may be a direct media interface (DMI), although the scope of the present invention is not limited in this regard. Incoming transactions may be received from a PCH that in turn can be coupled to one or more peripheral devices such as internal devices of a system or external peripheral devices such as USB devices, e.g., radio tuners, media players or so forth.

As shown in FIG. 1, method 100 may begin by receiving an incoming transaction from the interconnect (block 110). For example, an input/output (I/O) interface of a processor complex may receive incoming transactions. As described above, these transactions can be of different types, including various read and write transactions among other such transactions. Some of these transactions may be posted, while others are non-posted. Further, at least some of the posted transactions may be interrupt transactions such as MSIs or VLWs. The I/O interface or other input flow control mechanism, such as an arbiter coupled to the interface, may determine whether the transaction is a posted transaction (diamond 115). For example, the arbiter or other entity may analyze a packet header of the transaction to determine whether it is a posted transaction. If not, the transaction may be provided to a non-posted transaction queue (block 120). This queue may be part of a given logic block of the processor complex, such as uncore logic, which may include various structures and logic apart from the cores.

If instead at diamond 115 it is determined that the transaction is in fact a posted transaction, control passes to diamond 130 where it may be determined whether the transaction is an interrupt, such as a message signaled interrupt or a virtual legacy wire interrupt, which again may be determined by analysis of the message header. If not, control passes to block 135 where the posted transaction may be provided to a posted transaction queue. If instead it is determined that the transaction is an interrupt transaction, it may be provided to an interrupt transaction queue (block 140).

Thus as shown in FIG. 1, different queues may be maintained for posted transactions and interrupt transactions so that the interrupt transactions to do not block other incoming posted transactions. Rather, as will described further below, such transactions may continue to be processed even if a local advanced programmable interrupt controller (APIC), other interrupt controller, or processor core is in a low power state such that the interrupt transactions must remain within the queue until the APIC controller or one or more cores are powered back up.

Further processing may be performed in the interrupt queue when an entry is stored. Specifically, at diamond 150 it may be determined whether the local APIC is in a low power state. If so, control passes to diamond 160 where it may be determined whether the transaction meets a predetermined wake criteria to wake the core(s) from a low power state (diamond 160). For example, one policy may be to wake if the entry stored for this interrupt transaction is the first entry in the queue. If so, a flag may be set to indicate the presence of this at least one entry within the interrupt queue. Furthermore, a wakeup signal may be sent to the local APIC and to one or more cores in order to wake them up to handle this interrupt. Other wake policy option examples include: a) on first interrupt entry, wake after a timer expires; b) wake after a threshold of interrupts are enqueued; c) wake based on interrupt priority; or d) wake based on core(s) targeted. Method 100 thus concludes its processing with the storage of the incoming transaction into the appropriate queue. Of course other processing can then be performed on these transactions. Specifically, assuming that the one or more cores are in a normal operation mode, transactions may be sent from the queues to cores or other intended targets. In some implementations, an arbiter may be coupled to the output of the queues to arbitrate among the various transactions and send them to the appropriate locations.

If instead one or more cores and/or the local APIC are in a low power state, the interrupt transactions may remain queued within the interrupt queue. However, transactions from the posted and non-posted transaction queues may continue to be handled to the extent that such transactions do not need access to the cores. For example, for read or write requests that target main memory or cache memories that may not be powered down, these transactions can continue to pass out of the transaction queues and be handled. Thus these other transactions, which may have been received following the interrupt transaction(s), can effectively pass the interrupt transactions stored in the interrupt queue. As such, an underflow or other error condition of a peripheral device can be avoided. For example, assume that a core or local APIC is placed in a powered off state. When in this state, it may take a long period of time for a voltage ramp to occur and additional tasks such as initializing a phase lock loop (PLL) and other interfaces to come out of the low power state can be on the order of 50 to 100 µs, and thus corresponds to a latency exit time. Because a peripheral device may have a shorter frame time, e.g., 20 µs, if a response to peripheral signaling does not occur due to these signals being stalled behind a queued interrupt transaction, an underflow would occur. Thus by using a set aside mechanism, other peripheral transactions can be handled as expected by the peripheral device, avoiding to the underflow or other error condition. While described with this particular implementation in the embodiment of FIG. 1, the scope of the present invention is not limited in this regard.

Embodiments can be implemented in many different systems and processor types. However, certain implementations may be used in connection with a platform having a processor complex, which may be a single die integrated circuit including multiple processor cores, caches, associated logic, memory controller, interface controller and so forth.

Figure 2:
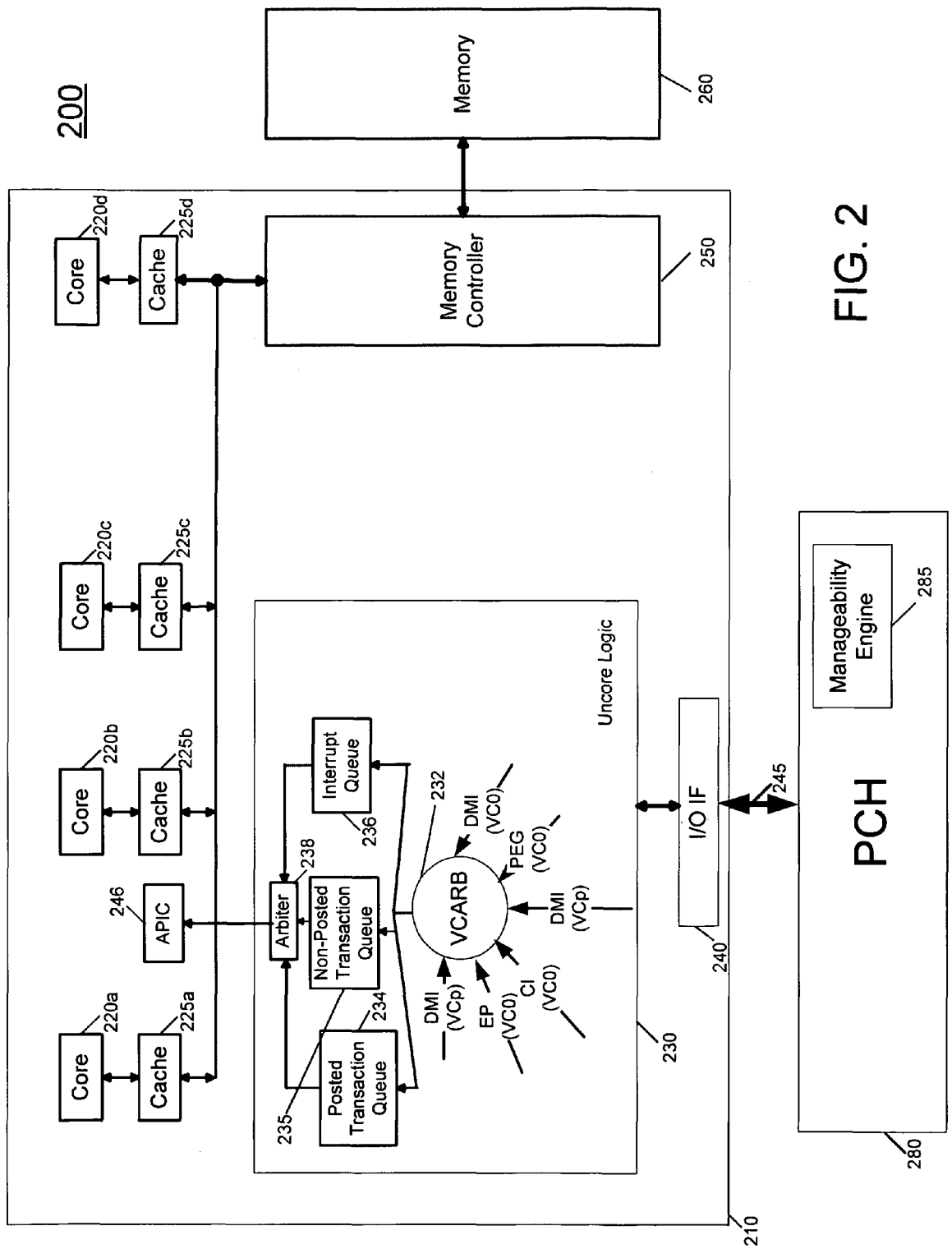
FIG. 2 is a block diagram of a portion of a system in accordance with one embodiment of the present invention.

Referring now to FIG. 2, shown is a block diagram of a portion of a system in accordance with one embodiment of the present invention. As shown in FIG. 2, system 200 includes a processor complex 210 that is coupled to a memory 260 which in one embodiment may be dynamic random access memory (DRAM), and a PCH 280. As shown in FIG. 2, processor complex 210 may include a plurality of cores $220_a$-$220_d$ (generically core 220). Each core may be associated with a corresponding cache memory $225_a$-$225_d$ (generically cache 225). In addition, processor complex 210 includes uncore logic 230, which may include various logic of the processor that is not resident in the cores such as certain interface and control logic. Also present within processor complex 210 is an I/O interface 240 that provides an interface to an interconnect 245, which in one embodiment may be a direct media interface (DMI) or another point-to-point interconnect that is coupled between processor complex 210 and PCH 280. In addition, processor complex 210 further includes a memory controller 250 that provides an interface between the complex and memory 260.

As further shown in FIG. 2, incoming requests are provided from I/O interface 240 to uncore logic 230, and more particularly to a queuing structure such as an arbiter 232 within the logic. In the implementation of FIG. 2, this arbiter is a virtual channel arbiter (VCARB) that is configured to receive incoming transactions from multiple virtual channels. In the embodiment shown, these channels may include a first virtual channel (VC0) as well as a second virtual channel (VCP). These virtual channels may be adapted to carry different traffic classes of communications and may receive transactions from various sources within processor complex 210 or other such sources.

Arbiter 232 may arbitrate among various incoming transactions and provide them to a selected queue based on the type of transaction. In the embodiment shown in FIG. 2, a posted transaction queue 234, a non-posted transaction queue 235, and an interrupt transaction queue 236 are present to receive transactions of these types. While the scope of the present invention is not limited in this regard, in one embodiment interrupt queue 236 may be at least 32 entries deep. In this way, this queue may be sized based on the known maximum number of interrupts that can cross an interconnect during a given time period in which a processor complex's cores can be in a low power state. In turn, queues 234 and 236 are coupled to an outbound arbiter 238 that may arbitrate the different transactions output from these queues.

As further shown in FIG. 2, processor complex 210 may include a local APIC 246. This APIC may be used to receive incoming interrupts, e.g., via arbiter 238 and notify one or more cores of the interrupts. Note that local APIC 246 can be controlled independently of the cores and other logic of the processor complex. That is, the APIC can be independently placed into and out of low power states. In this way, when no interrupts are present to handle, local APIC 246 can be placed into a low power state. Similarly, even though one or more cores 220 may be in a low power state, local APIC 246 can be powered on to handle incoming interrupts. Different implementations of APICs are possible. For example, instead of a single APIC for all cores, there may be a local APIC associated with each core, which can be within the core well or be outside the core well.

Logic of uncore logic 230 may be used to control the power states of local APIC 246. For example, when the interrupt transaction queue 236 is empty, a signal, message or power management policy may enable local APIC 246 to enter into a low power state. Similarly, for example, when a first interrupt transaction is written into interrupt transaction queue 236, a wake up signal or message can be sent to local APIC 246. While shown with these limited components for ease of illustration understand that additional components may be present within processor complex 210, such as fixed function units, other processing units and so forth.

Thus using an implementation such as shown in FIG. 2, transactions within posted transaction queue 234 can continue to be handled while local APIC 246 of the processor complex is in a low power state such that interrupt transactions remain within interrupt queue 236. Of course, when at least one interrupt is present within interrupt queue 236, a wake signal or message may be sent to the APIC and/or one or more of the cores to trigger their wakeup to handle this interrupt. When a core is powered on, it sends a message to indicate it is ready to handle operations, a trigger signal is sent to queue 236 storing the interrupt transactions to cause them to be sent to the local APIC and then to the core. While shown with this particular implementation in the embodiment of FIG. 2, the scope of the present invention is not limited in this regard.

Figure 3:
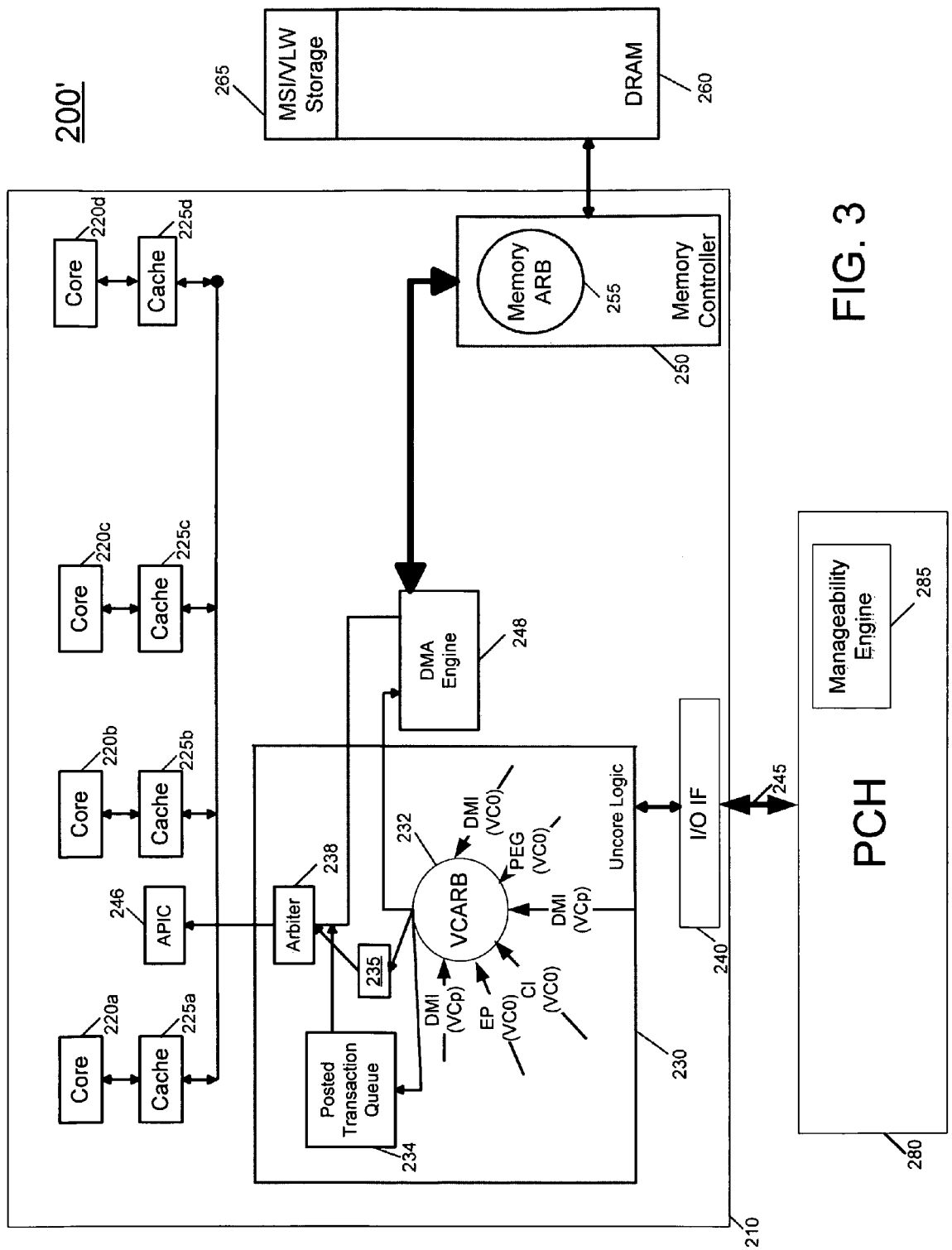
FIG. 3 is a block diagram of a processor complex in accordance with another embodiment of the present invention.

As described above, in various implementations, rather than providing an on-chip storage for incoming interrupt transactions, available storage off-chip may be used for such storage. Referring now to FIG. 3, shown is a block diagram of a processor complex in accordance with another embodiment of the present invention. As shown in FIG. 3, processor complex 210 may be arranged similarly to that of processor complex of FIG. 2. However, in the implementation of FIG. 3, note that there is not a separate interrupt transaction queue present within uncore logic 230 of the processor complex. Instead, in the embodiment of FIG. 3 a dedicated storage space 265 within memory 260 may be used for storage of these interrupts. To provide incoming posted interrupt transactions to memory 260, arbiter 232 may be coupled to a direct memory access (DMA) engine 248, which can receive posted interrupt transactions and handle their storage to memory 260. Specifically, DMA engine 248 may communicate with a memory arbiter 255 of MCH 250 to thus provide received interrupts to dedicated storage 265. Both memory arbiter 255 and DMA engine 248 may further operate in reverse to take stored interrupts and provide them through arbiter 238 to local APIC 246, when the APIC is powered up and able to handle interrupts.

Figure 4:
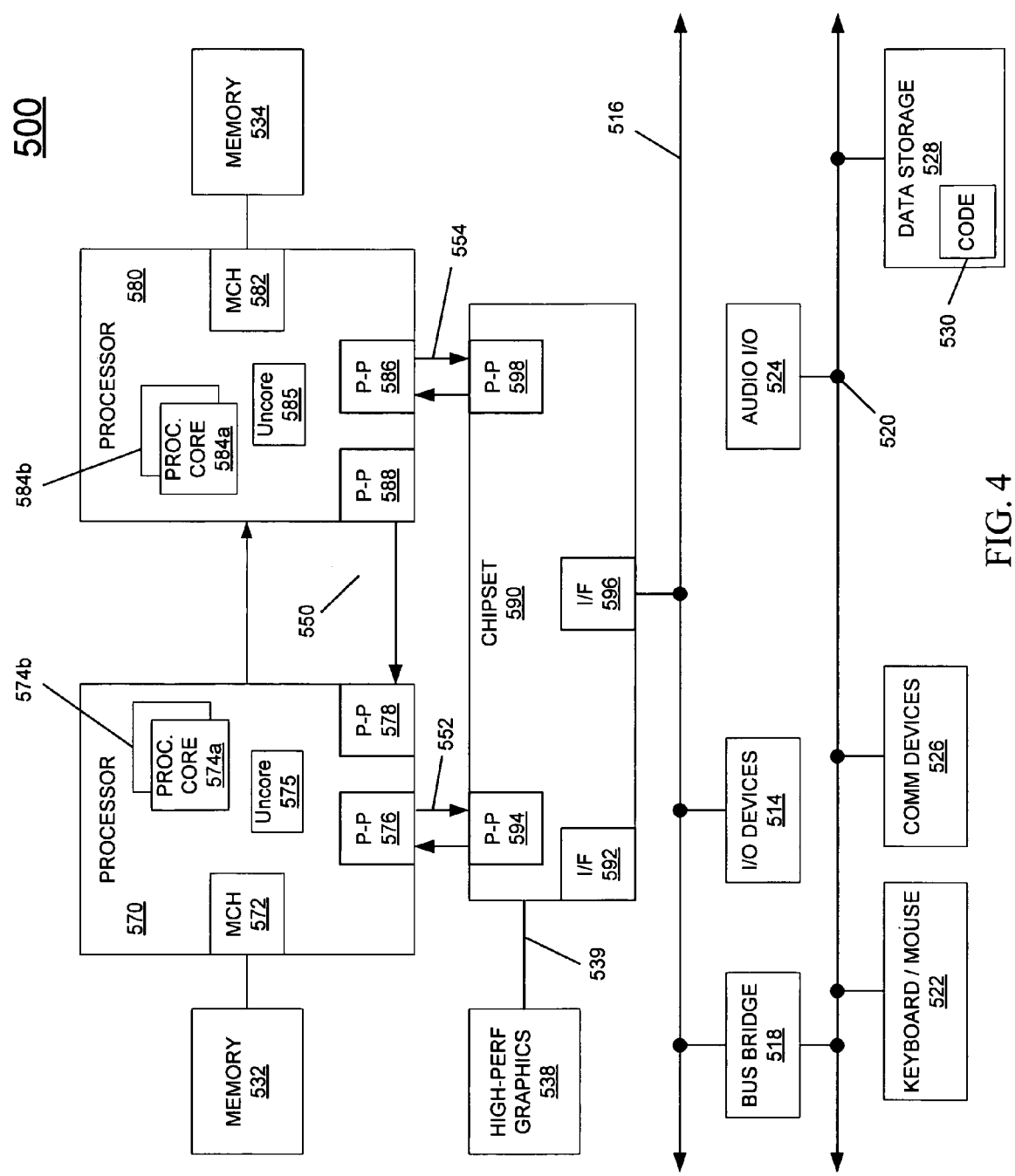
FIG. 4 is a block diagram of a system in accordance with one embodiment of the present invention.

Embodiments may be implemented in many different system types. Referring now to FIG. 4, shown is a block diagram of a system in accordance with an embodiment of the present invention. As shown in FIG. 4, multiprocessor system 500 is a point-to-point interconnect system, and includes a first processor 570 and a second processor 580 coupled via a point-to-point interconnect 550. As shown in FIG. 4, each of processors 570 and 580 may be multicore processors, including first and second processor cores (i.e., processor cores 574a and 574b and processor cores 584a and 584b). Each processor may further include uncore logic 575 and 585, which may include a set aside mechanism to handle interrupt transactions separately from other posted transactions.

Still referring to FIG. 4, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 4, MCH's 572 and 582 couple the processors to respective memories, namely a memory 532 and a memory 534, which may be portions of main memory (e.g., a dynamic random access memory (DRAM)) locally attached to the respective processors. First processor 570 and second processor 580 may be coupled to a chipset 590 via P-P interconnects 552 and 554, respectively. As shown in FIG. 4, chipset 590 includes P-P interfaces 594 and 598.

Furthermore, chipset 590 includes an interface 592 to couple chipset 590 with a high performance graphics engine 538. In turn, chipset 590 may be coupled to a first bus 516 via an interface 596. As shown in FIG. 4, various I/O devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
 receiving an incoming posted transaction in a queuing structure of a processor complex from a peripheral device; and determining if the incoming posted transaction is an interrupt transaction and if so, routing the interrupt transaction to a first queue to allow non-interrupt incoming posted transactions and non-posted transactions to pass the interrupt transaction when at least a portion of the processor complex is in a low power state, and otherwise routing the incoming posted transaction to a second queue of the processor complex.

2. The method of claim 1, further comprising routing the interrupt transaction to the first queue, wherein the first queue is a dedicated portion of a system memory coupled to the processor complex.

3. The method of claim 1, further comprising routing the interrupt transaction to the first queue, wherein the first queue is a separate queue of the processor complex.

4. The method of claim 1, further comprising handling the incoming posted transaction in the second queue while at least one interrupt transaction is stored in the first queue due to a low power state of an advanced programmable interrupt controller (APIC) of the processor complex.

5. The method of claim 4, further comprising causing the APIC and at least one core of the processor complex to be activated when a first one of the at least one interrupt transaction is written into the first queue.

6. The method of claim 4, further comprising transmitting data from the processor complex to the peripheral device responsive to the handled incoming posted transaction, wherein the peripheral device avoids an underflow condition as a result of the handled incoming posted transaction, wherein at least the portion of the processor complex is in the low power state, and at least one core of the processor complex is powered off in the low power state.

7. The method of claim 4, wherein the interrupt transaction is a virtual legacy wire interrupt.

8. The method of claim 4, wherein storing the interrupt transaction in the first queue allows a second incoming posted transaction received in the processor complex after the interrupt transaction to pass the interrupt transaction, wherein ordering rules for an interconnect coupled between the processor complex and the peripheral device do not allow a later posted transaction to pass an earlier posted transaction.

9. An apparatus comprising:
a processor complex including:
an interface to receive incoming transactions from a peripheral device;
an arbiter to receive the incoming transactions from the interface and to handle an incoming posted transaction using a set aside mechanism if the incoming posted transaction is an interrupt transaction, and to otherwise store the incoming posted transaction in a posted queue;
a plurality of cores coupled to the arbiter to perform operations responsive to instructions; and
memory controller coupled to the arbiter to communicate with a system memory.

10. The apparatus of claim 9, further comprising at least one interrupt controller coupled to the plurality of cores, wherein the at least one interrupt controller is to be activated after receipt of the interrupt transaction based on a policy associated with the set aside mechanism.

11. The apparatus of claim 10, wherein the memory controller is to handle at least one posted transaction stored in the posted queue when the at least one interrupt controller is in a low power state, wherein an interrupt queue of the set aside mechanism and the posted queue are independent such that the at least one posted transaction received in the processor complex subsequent to the interrupt transaction is not blocked by the interrupt transaction.

12. The apparatus of claim 10, wherein the set aside mechanism is a dedicated portion of the system memory and the posted queue is present in the processor complex.

13. The apparatus of claim 12, further comprising a direct memory access (DMA) engine to receive the interrupt transaction from the arbiter and to cause the interrupt transaction to be stored in the dedicated portion of the system memory.

14. The apparatus of claim 10, wherein an interrupt queue of the set aside mechanism is to set a flag in an entry corresponding to the interrupt transaction if no other entries are present in the interrupt queue.

15. The apparatus of claim 14, wherein the flag is to cause a message to be sent to the at least one interrupt controller.

16. The apparatus of claim 9, wherein at least one transaction from the posted queue is to be handled while an interrupt transaction is stored in the set aside mechanism and at least one of the plurality of cores is in a low power state.

17. A system comprising:
a processor complex including an interface to receive incoming transactions from a peripheral device, a logic to receive the incoming transactions from the interface and to determine whether an incoming posted transaction is an interrupt transaction and if so, to store the incoming transaction in an interrupt queue and to otherwise store the incoming posted transaction in a posted queue, a plurality of cores coupled to the logic to perform operations responsive to instructions, and a memory controller coupled to the logic to communicate with a memory;
the memory coupled to the processor complex; and
a peripheral device coupled to the processor complex by an interconnect to transmit the incoming transactions to the processor complex.

18. The system of claim 17, wherein at least one core is to be placed into a power off state having a first latency exit time, and the peripheral device is to receive a response to a first transaction within a second time to avoid an error condition, wherein the second time is less than the first latency exit time, and the first transaction is to pass one or more interrupt transactions stored in the interrupt queue and be handled by the logic of the processor complex within the second time.

19. The system of claim 17, further comprising an interrupt controller coupled to the plurality of cores, wherein the interrupt controller is to receive a message from the interrupt queue when an entry is written into the interrupt queue corresponding to the interrupt transaction and the logic is to handle at least one incoming posted transaction stored in the posted queue when the interrupt controller is in a low power state.

20. The system of claim 17, wherein the interrupt queue is a dedicated portion of the memory and the posted queue is present in the processor complex and further comprising a direct memory access (DMA) engine to receive the interrupt transaction from the logic and to cause the interrupt transaction to be store in the dedicated portion of the memory.

* * * * *